United States Patent [19]
Metzger et al.

[11] 3,759,939
[45] Sept. 18, 1973

[54] CERTAIN 1-(1,3,4-THIADIAZOL-2-YL)-IMIDAZOLIDINONE-(2) COMPOUNDS

[75] Inventors: Carl Metzger, Wuppertal-Elberfeld; Dietrich Rucker, Bietigheim; Ludwig Eue, Koeln, all of Germany

[73] Assignee: Bayer Aktiengesellschaft, Leverkusen, Germany

[22] Filed: Mar. 10, 1971

[21] Appl. No.: 123,013

[30] Foreign Application Priority Data
Mar. 20, 1970 Germany............. P 20 13 406.9

[52] U.S. Cl............................ 260/306.8 D, 71/90
[51] Int. Cl.................................... C07d 99/08
[58] Field of Search................ 260/306.8 D

[56] References Cited
OTHER PUBLICATIONS
Mayer et al., Chem. Abstracts.

Primary Examiner—Richard J. Gallagher
Attorney—Burgess, Dinklage & Sprung

[57] ABSTRACT

Certain novel 1-(1,3,4-thiadiazol-2-yl)-imidazolidinone-(2) compounds of the formula:

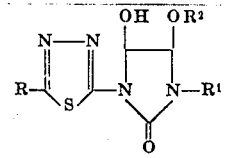

in which

R is hydrogen, alkyl, haloalkyl, cycloalkyl, alkoxy, alkoxyalkyl, halocycloalkyl, alkoxyalkylthio, unsubstituted and substituted aryl, alkenyl, alkynl, alkylthio, (optionally substituted) aralkylthio, alkenylthio, alkynylthio or alkyl-, alkenyl-, alkynyl and aralkyl-sulfur substituents in which the sulfur is oxidized to sulfonyl or sulfoxy;

$R_1$ is lower alkyl, alkenyl or alkynyl; and $R_2$ is lower alkyl or alkenyl;

are outstandingly effective herbicides exhibiting particularly selective action.

11 Claims, No Drawings

CERTAIN 1-(1,3,4-THIADIAZOL-2-YL)-IMIDAZOLIDINONE-(2) COMPOUNDS

The present invention relates to certain new 1-(1,3,4-thiadiazol-2-yl)-imidazolidinone-(2) derivatives, to herbicidal compositions containing them and to their use as herbicides.

It is known that thiazolylureas, for example 1-(4-methyl-1,3-thiazol-2-yl)-3-methylurea, can be used as herbicides from Belgian Pat. Specification No. 679,138. The herbicidal potency of these previously known ureas, however, is relatively low and therefore not always satisfactory under conditions of actual practice.

It was therefore surprising that certain thiadiazolyl imidazolidinone compounds according to the invention exhibit higher herbicidal activity and, at the same time, greater selectivity in respect of cultivated plants, than the previously known thiazolylureas. The active compounds according to the invention therefore represent a substantial enrichment of the art.

Specifically, the present invention provides 1-(1,3,4-thiadiazol-2-yl)-imidazolidinone-(2) derivatives of the general formula:

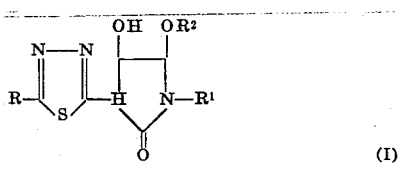

(I)

in which

R is hydrogen, alkyl, haloalkyl, cycloalkyl, alkoxy, alkoxyalkyl, halocycloalkyl, alkoxyalkylthio, unsubstituted and substituted aryl, alkenyl, alkylthio, (optionally substituted) aralkylthio, alkenylthio, alkynylthio, alkylsulfoxy, alkylsulfonyl, alkenylsulfoxy, alkenylsulfonyl, alkynylsulfoxy, alkynylsulfonyl, aralkylsulfoxy or aralkylsulfonyl, $R^1$ is lower alkyl, alkenyl or alkynyl, and $R^2$ is lower alkyl or alkenyl.

R is preferably hydrogen, alkyl of from one to four carbon atoms, haloalkyl of from one to four carbon atoms, cycloalkyl of from five to eight carbon atoms, alkoxy of from one to four carbon atoms, alkoxyalkyl of from , in each case, one to four carbon atoms in the alkyl radicals, halocyclalkyl of from five to eight ring carbon atoms, alkoxyalkylthio of from, in each case, one to four carbon atoms in the alkyl radicals, (possibly substituted) aryl of from six to ten carbon atoms, alkenyl of from three to six carbon atoms, alkynyl of from two to five carbon atoms, alkylthio of from one to four carbon atoms (possibly substituted) aralkylthio of from six to ten carbon atoms in the aryl radical and one to four carbon atoms in the alkyl radical, alkenylthio with two to four carbon atoms, (possibly substituted) aralkylthio of from six to ten carbon atoms in the aryl radical and one to four carbon atoms in the alkylene radical, alkenylthic of from two to four carbon atoms, alkynylthio of from three to six carbon atoms, alkylsulfoxyl of from one to four carbon atoms, alkylsulfonyl of from one to four carbon atoms, alkenylsulfoxyl of from two to four carbon atoms, alkenylsulfonyl of from two to four carbon atoms, alkynylsulfonyl of from three to six carbon atoms, aralkylsulfoxyl and aralkylsulfonyl of from, in each case, six to 10 carbon atoms in the aryl radical and one to four carbon atoms in the alkylene radical.

$R^1$ is preferably alkyl of from one to four carbon atoms, or alkenyl or alkynyl of from, in each case, two to five carbon atoms.

$R^2$ is preferably alkyl of from one to four carbon atoms or alkenyl of from two to four carbon atoms.

It has surprisingly been found that these compounds exhibit strong herbicidal properties.

The invention also provides a process for the production of a 1-(1,3,4-thiadiazol-2-yl)-imidazolidinone-(2) derivative of the formula (I) in which a 1-(1,3,4-thiadiazol-2-yl)-4,5-dihydroxyimidazolidinone-(2) of the general formula:

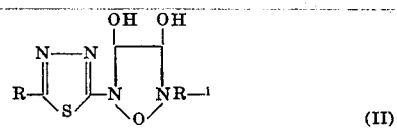

(II)

in which

R and $R^1$ have the meanings stated above is reacted with an alcohol of the general formula:

$$R^2\text{-OH}$$

(III)

in which $R^2$ has the meaning stated above in the presence of an acidic catalyst.

If 1-(5-trifluoromethyl-1,3,4-thiadiazole-2-yl)-3-methyl-4,5-dihydroxylimidazolidinone-(2) and methanol are used as starting materials, the reaction course can be represented by the following reaction scheme:

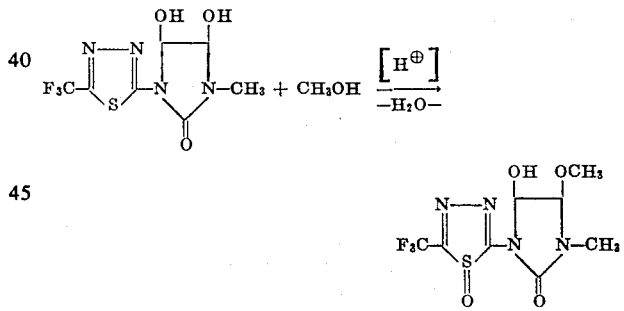

The 1-(1,3,4-thiadiazol-2-yl)-4,5-dihydroxy-imidazolidinones-(2) to be used as starting materials are defined generally by the formula (II).

1-(1,3,4-thiadiazol-2-yl)-4,5-dihydroxy-imidazolidinones-(2) according to formula (II) used as starting materials are not yet known but can be prepared by reacting 1,3,4-thiadiazol-2-yl ureas, in the presence of alkaline catalysts and optionally in the presence of a diluent, with glyoxal at temperatures between 40°–80° C. This process is illustrated by the following preparative examples: Example a.

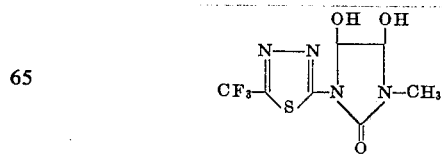

100 ml of a 30 percent strength aqueous solution of glyoxal (which solution had been adjusted to pH 7-8 with dilute sodium hydroxide solution) were added dropwise to a solution of 45.4g (0.2 mole) N-(trifluoromethyl-1,3,4-thiadiazol-2-yl)-N-methylurea in 500 ml ethanol. After standing overnight, the solvent was distilled off in a vacuum, and water was added to the residue. After recrystallization from acetonitrile, 1-(5-trifluoromethyl-1,3,4-thiadiazol-2-yl)-3-methyl-4,5-dihydroxyimidazolidinone-(2) was obtained in crystalline form; melting point: 178° C.

In analogous manner, the following compounds were prepared:

b. 1-(5-methylthio-1,3,4-thiadiazol-2-yl)-3-methyl-4-5-dihydroxy-imidazolidinone-(2) of the melting point 55° C.

c. 1-(5-methylsulfonyl-1,3,4-thiadiazol-2-yl)3-methyl-4,5-dihydroxy-imidazolidinone-(2) of the melting point 67° C.

As diluents for the reaction according to the invention of the 1-(1,3,4-thiadiazol-2-yl)4,5-dihydroxy-imidazolidinones-(2) of the formula (II) with alcohols of the formula (III), all inert organic solvents are suitable. Preferably, however, an excess of the alcohol of the formula (III), as for example methanol, ethanol n-propanol or isopropanol, is used as diluent.

As acidic catalysts, all strong acids can be used; concentrated sulfuric acid is particularly suitable.

The reaction temperatures can be varied within a fairly wide range. In general, the reaction is carried out at 0° to 150° C, preferably 20° to 120° C.

In a suitable way of carrying out the process according to the invention, a solution of the imidazolidinone derivative of the formula (II) is boiled under reflux in an excess of the alcohol with the addition of a small amount of a strong acid.

Working up may take place in customary manner. The reaction products can be purified by recrystallization.

EXAMPLE 1

Preparation of 1-(5-methylsulfonyl-1,3,4-thiadiazol-2-yl)-3-methyl-4-methoxy-5-hydroxyimidazolidinone-(2)

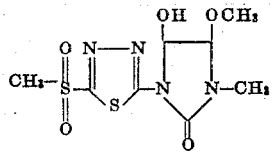

43.9 g (0.15 mole) 1-(5-methylsulfonyl-1,3,4-thiadiazol-2-yl)-3-methyl-4,5-dihydroxyimidazolidone(2) were heated under reflux for 24 hours with 100 ml of absolute methanol and 2 ml of concentrated sulfuric acid. Concentration in a vacuum was then effected after trituration, 1-(5-methylsulfonyl-1,3,4-thiadiazol-2-yl)-3-methyl-4-methoxy-5-hydroxyimidazolidinone-(2) crystallized out. Recrystallization from methanol was effected. Melting point: 140° C.

EXAMPLES 2 – 19

In manner analogous to that of Example 1, the compounds listed in the following Table were also prepared. The compounds produced are identified by the meanings of R, $R^1$ and $R^2$, in formula (1), set forth.

TABLE

| Example | R | $R^1$ | $R^2$ | Melting point (°C) |
|---|---|---|---|---|
| 2 | $CF_3$ | $CH_3$ | $CH_3$ | 148 |
| 3 | $CH_3SO_2$ | $CH_3$ | $C_2H_5$ | 141 |
| 4 | tert.-$C_4H_9$ | $CH_3$ | $CH_3$ | 161 |
| 5 | tert.-$C_4H_9$ | $CH_3$ | $C_2H_5$ | 117 |
| 6 | tert.-$C_4H_9$ | $CH_3$ | i-$C_3H_7$ | 148 |
| 7 | tert.-$C_4H_9$ | $CH_3$ | n-$C_3H_7$ | 102 |
| 8 | $CH_3$ | $CH_3$ | $C_2H_5$ | 97 |
| 9 | $CF_3$ | $CH_3$ | $CH(CH_3)_2$ | 102 |
| 10 | $CH_3S$ | $CH_3$ | $CH_3$ | 132 |
| 11 | $CH_3S$ | $CH_3$ | $C_2H_5$ | 132 |
| 12 | $C_2H_5S$ | $CH_3$ | $CH_3$ | 93 |
| 13 | $C_2H_5S$ | $CH_3$ | $C_2H_5$ | 97 |
| 14 | n-$C_3H_7S$ | $CH_3$ | $CH_3$ | 99 |
| 15 | n-$C_3H_7S$ | $CH_3$ | $C_2H_5$ | 95 |
| 16 | i-$C_3H_7S$ | $CH_3$ | $CH_3$ | 64 |
| 17 | i-$C_3H_7S$ | $CH_3$ | $C_2H_5$ | 94 |
| 18 | n-$C_4H_9S$ | $CH_3$ | $CH_3$ | 82 |
| 19 | n-$C_4H_9S$ | $CH_3$ | $C_2H_5$ | 92 |

The active compounds according to the invention have excellent herbicidal properties and can therefore be used for the control of weeds. By weeds in the widest sense are meant all plants which grow in places where they are not desired. Whether the substances according to the invention act as total or as selective herbicides depends essentially on the amount applied.

The substances according to the invention can be used for example in the case of the following plants: dicotyledons, such as mustard (*Sinapis*), cress (*Lepidium*), cleaver (*Galium*), common chickweed (*Stellaria*), mayweed (*Matricaria*), smallflower Galinsoga (*Galinsoga*), fat hen (*Chenopodium*), stinging nettles (*Urtica*), groundsel (*Senecio*), cotton (*Gossypium*), beets (*Beta*), carrots (*Daucus*), beans (*Phaseolus*), potatoes (*Solanum*), coffee (*Coffea*); monocotyledons, such as timothy (*Phleum*), bluegrass (*Poa*), fescue (*Festuca*), goosegrass (*Eleusine*), foxtail (*Setaria*), ryegrass (*Lolium*), cheat (*Bromus*), barnyard grass (*Echinochloa*), maize (*Zea*), rice (*Oryza*), oats (*Avena*), barley (*Hordeum*), wheat (*Triticum*), millet (*Panicum*), sugar cane (*Saccharum*).

The compounds are especially suitable for selective weed control in cereals, cotton, sugar-beet and other cultivations. They can advantageously also be used for the control of spring wild oats.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is emulsifying agents and/or dispersing agents. In the case of the use of water as an extruder, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sylfonates and aryl sulfonates; and preferred examples of dispersing agents include lignin, sulfite waste liquors and methyl cellulose.

The active compounds according to the invention may be present in the formulations in admixture with other active compounds or may be mixed therewith at the time of application.

The formulations contain, in general, 0.1 to 95, preferably 0.5 to 90, per cent by weight of active compound.

The active compounds can be applied as such or in the form of their formulations or of the application forms prepared therefrom, such as ready-to-use solutions, emulsions, suspensions, powders, pastes and granulates. Application may take place in the usual manner, for example by spraying, squirting, dusting or scattering.

When the compounds are applied as total herbicides, the amounts of active compound are generally 25 to 40 kg/hectare. In selective weed control, the applied amounts are generally 1 to 20 kg/hectare, preferably 2 to 15 kg/hectare.

The active compounds can be used before or after the emergence of the cultivated plants and the weeds, especially before the emergence.

The active compounds according to the invention also exhibit insecticidal properties and also act against mosquito larvae.

The invention therefore provides a herbicidal composition containing as active ingredient a compound according to the invention in admixture with a solid diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a solid or liquid diluent or carrier.

The invention also provides crops protected from damage by weeds by being grown in areas in which, immediately prior to and/or during the time of the growing, a compound according to the invention was applied alone or in admixture with a solid or liquir diluent carrier. It will be seen that the invention can improve usual methods of providing harvested crops.

The invention is illustrated by the following Examples in which the test compounds were as follows:

| Compound No. | Chemical name | Structure |
|---|---|---|
| 1 | 1-(5-methylsulfonyl-1,3,4-thiadiazol-2-yl)-3-methyl-4-methoxy-5-hydroxyimidazolidinone (2) | (structure) |
| 2 | 1-(5-methylsulfonyl-1,3,4-thiadiazol-2-yl)-3-methyl-4-ethoxy-5-hydroxyimidazolidinone-(2) | (structure) |
| 3 | 1-(5-tert. butyl-1,3,4-thiadiazol-2-yl)-3-methyl-4-ethoxy-5-hydroxyimidazolidinone-(2) | (structure) |
| 4 | 1-(5-tert. butyl-1,3,4-thiadiazol-2-yl)-3-methyl-4-methoxy-5-hydroxyimidazolidinone-(2) | (structure) |
| 5 | 1-(5-tert butyl-1,3,4-thiadiazol-2-yl)-3-methyl-4-isoproxy-5-hydroxyimidazolidinone-(2) | (structure) |
| 6 | 1-(5-trifluoromethyl-1,3,4-thiaziazol-2-yl)-3-methyl-4-methoxy-5-hydroxyimidazolidinone-(2) | (structure) |

EXAMPLE A

Pre-emergence test
  Solvent:   5 parts by weight acetone
  Emulsifier:   1 part by weight alkylarylpolygolycol ether To produce a suitable preparation of active compound, one part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which have the following meaning:
  0 no effect
  1 slight damage or delay in growth
  2 marked damage or inhibition of growth
  3 heavy damage and only deficient development or only 50 percent emerged
  4 plants partially destroyed after germination or only 25 percent emerged
  5 plants completely dead or not emerged.

The active compounds, the amount applied and the results obtained can be seen from Tables 1 and 2.

EXAMPLE B

Post-emergence test
  solvent:   5 parts by weight acetone
  Emulsifier:   1 part by weight alkylarylpolyglycol ether To produce a suitable preparation of active compound, one part by weight of active compound was mixed with the stated amount of solvent, the stated amount of emulsifier was added and the concentrate was then diluted with water to the desired concentration.

Test plants which have a height of about 5–15 cm. were sprayed with the preparation of the active compound so that the amounts of active compound per unit area which are stated in the Table were applied. Depending on the concentration of the spray liquor, the amount of water applied lay between 1,000 and 2,000 liters/hectare.

After three weeks, the degree of damage to the plants was determined and characterized by the values 0–5, which have the following meaning:
  0 no effect
  1 a few slightly burnt spots
  2 marked damage to leaves
  3 some leaves and parts of stalks partially dead
  4 plant partially destroyed
  5 plant completely dead.

The active compounds, the amount applied and the results can be seen from Tables 3 and 4.

TABLE 1.—PREEMERGENCE TEST

| Active compound | Active compound applied kg./hectare | Avena fatua | Sina-pis | Poly-gonum | Echino-chloa | Galin-soga | Matri-caria | Wheat | Sugar-beet |
|---|---|---|---|---|---|---|---|---|---|
| 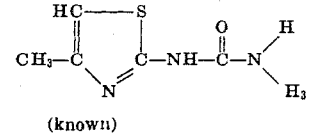 (known) | 10 | 4 | 3 | 5 | 4 | 4–5 | 5 | 4–5 | 5 |
|  | 5 | 3 | 2–3 | 4 | 3 | 4 | 4 | 3 | 4 |
|  | 2.5 | 2 | 1 | 3 | 2 | 3 | 4 | 1 | 2–3 |
| Compound 1 | 10 | 5 | 5 | 5 | 5 | 5 | 5 | 1–2 | 1 |
|  | 5 | 4–5 | 5 | 5 | 4–5 | 5 | 5 | 0 | 0 |
|  | 2.5 | 4 | 5 | 4–5 | 4 | 5 | 4 | 0 | 0 |
| Compound 2 | 10 | 5 | 5 | 5 | 5 | 5 | 5 | 2 | 1–2 |
|  | 5 | 4–5 | 5 | 5 | 5 | 5 | 5 | 1 | 0 |
|  | 2.5 | 3 | 5 | 5 | 4–5 | 5 | 4–5 | 0 | 0 |

TABLE 2

| Active compound | Active compound applied kg./hectare | Sina-pis | Poly-gonum | Echino-chlon | Cheno-podium | Stel-laria | Lol-ium | Matri-caria | Oats | Cot-ton | Wheat | Maize |
|---|---|---|---|---|---|---|---|---|---|---|---|---|
| Compound 3 | 20 | 5 | 5 | 5 | 5 | 5 | 5 | 5 | 5 | 4–5 | 4–5 | 4–5 |
|  | 10 | 5 | 5 | 5 | 5 | 5 | 5 | 5 | 5 | 4–5 | 4–5 | 4–5 |
|  | 5 | 5 | 5 | 5 | 5 | 5 | 5 | 5 | 5 | 4–5 | 4 | 4–5 |
|  | 2.5 | 5 | 5 | 5 | 5 | 5 | 5 | 5 | 5 | 4 | 4 | 4 |
|  | 1.25 | 5 | 4–5 | 5 | 5 | 5 | 5 | 5 | 5 | 4 | 3–4 | 4 |
| Compound 4 | 20 | 5 | 5 | 5 | 5 | 5 | 5 | 5 | 4 | 4–5 | 4 | 4–5 |
|  | 10 | 5 | 5 | 5 | 5 | 5 | 5 | 5 | 5 | 4–5 | 4 | 4–5 |
|  | 5 | 5 | 5 | 5 | 5 | 5 | 5 | 5 | 5 | 4–5 | 4 | 4–5 |
|  | 2.5 | 5 | 5 | 5 | 5 | 5 | 5 | 5 | 5 | 4–5 | 4 | 4–5 |
|  | 1.25 | 5 | 5 | 5 | 5 | 5 | 5 | 5 | 4–5 | 4 | 3 | 4 |
| Compound 5 | 20 | 5 | 5 | 5 | 5 | 5 | 5 | 5 | 5 | 5 | 4 | 4–5 |
|  | 10 | 5 | 5 | 5 | 5 | 5 | 5 | 5 | 5 | 5 | 4 | 4–5 |
|  | 5 | 4–5 | 4–5 | 4–5 | 5 | 4–5 | 4 | 5 | 4–5 | 4–5 | 3–4 | 4 |
|  | 2.5 | 4 | 4–5 | 4 | 4 | 4–5 | 4 | 5 | 4–5 | 4–5 | 3 | 4 |
|  | 1.25 | 4 | 2 | 3–4 | 4 | 4–5 | 4 | 5 | 4 | 4 | 3 | 3–4 |

TABLE 3.—POST-EMERGENCY TEST

| Active compound | Active compound applied kg./hectare | Echino-chloa | Cheno-podium | Sina-pis | Galin-soga | Stel-laria | Car-rots | Cot-ton | Wheat |
|---|---|---|---|---|---|---|---|---|---|
| HC——S  O  H<br>CH₃—C\\  //C—NH—C—N<br>    N         CH₃<br>(known) | 4<br>2<br>1 | 3<br>3<br>1 | 5<br>4-5<br>4 | 5<br>4-5<br>4 | 5<br>4-5<br>3 | 4<br>3<br>2 | 1<br>1<br>0 | 2<br>1<br>0 | 2<br>1-2<br>0 |
| Compound 1 | 4<br>2<br>1 | 5<br>5<br>5 | 5<br>4<br>3 | 5<br>5<br>5 | 5<br>5<br>5 | 4-5<br>3-4<br>3 | 5<br>5<br>4 | 1-2<br>0<br>0 | 5<br>5<br>4 |
| Compound 6 | 2<br>1<br>0.5 | 5<br>5<br>5 | 5<br>5<br>5 | 5<br>5<br>5 | 5<br>5<br>5 | 5<br>5<br>5 | 5<br>5<br>5 | 5<br>4<br>3 | 4<br>3<br>1 |

TABLE 4.—POST-EMERGENCE TEST

| Active compound | Active compound applied kg./hectare | Echino-chloa | Cheno-podium | Sina-pis | Galin-soga | Stel-laria | Ur-tica | Matri-caria | Car-rots | Oats | Cot-ton | Wheat | Beans |
|---|---|---|---|---|---|---|---|---|---|---|---|---|---|
| Compound 3 | 4<br>2<br>1<br>0.5<br>0.25 | 5<br>5<br>5<br>4-5<br>4 | 5<br>5<br>5<br>5<br>4-5 | 5<br>5<br>5<br>5<br>5 | 5<br>5<br>5<br>5<br>5 | 5<br>5<br>5<br>5<br>2 | 5<br>5<br>5<br>5<br>5 | 5<br>5<br>5<br>3<br>1 | 5<br>5<br>5<br>5<br>1 | 5<br>5<br>5<br>4-5<br>4-5 | 5<br>5<br>5<br>4<br>3-4 | 5<br>5<br>5<br>4<br>2 | 5<br>5<br>5<br>4<br>1-2 |
| Compound 4 | 4<br>2<br>1<br>0.5<br>0.25 | 5<br>5<br>5<br>4-5<br>4 | 5<br>5<br>5<br>5<br>4 | 5<br>5<br>5<br>5<br>5 | 5<br>5<br>5<br>5<br>4-5 | 5<br>5<br>5<br>5<br>5 | 5<br>5<br>5<br>5<br>5 | 5<br>5<br>5<br>3<br>2-3 | 5<br>5<br>5<br>5<br>3 | 5<br>5<br>5<br>4-5<br>4-5 | 5<br>5<br>3<br>2<br>2 | 5<br>5<br>5<br>4<br>3 | 5<br>5<br>5<br>5<br>3 |
| Compound 5 | 2<br>4<br>2<br>1<br>0.5<br>0.25 | <br>5<br>5<br>4<br>3-4<br>3 | <br>5<br>5<br>5<br>4<br>2 | <br>5<br>5<br>5<br>5<br>5 | <br>5<br>5<br>5<br>3<br>1 | 5<br>5<br>5<br>5<br>3<br>3 | 5<br>5<br>5<br>5<br>5<br>3 | <br>5<br>2<br>2<br>1<br>0 | <br>5<br>5<br>4<br>3<br>1 | <br>5<br>4-5<br>4-5<br>4<br>4 | <br>5<br>4<br>3-4<br>3<br>1 | <br>5<br>4-5<br>3<br>2<br>1 | <br>5<br>5<br>5<br>3<br>1 |

It will be understood that the specification and examples are illustrative but not limitative of the present invention and that other embodiments with the spirit and scope of the invention will suggest themselves to those skilled in the art.

What is claimed is:

1. 1-(1,3,4-Thiadiazol-2-yl)-imidazolidinone-(2) compounds of the general formula:

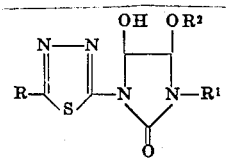

in which
R is alkyl, haloalkyl, alkylthio, alkylsulfoxyl, or alkylsulfonyl, wherein the alkyl radicals have up to four carbon atoms,
R₁ is alkyl having up to four carbon atoms.
R₂ is alkyl having up to four carbon atoms.

2. Compound as claimed in claim 1 wherein R is alkyl of from one to four carbon atoms.

3. Compound as claimed in claim 1 wherein R is haloalkyl of from one to four carbon atoms.

4. Compound as claimed in claim 1 wherein R is alkylthio of from one to four carbon atoms in the alkyl moiety.

5. Compound as claimed in claim 1 wherein R is a alkyl-sulfur group wherein the sulfur atom may be in any oxidation state.

6. Compound as claimed in claim 1 designated 1-(5-methylsulfonyl-1,3,4-thiadiazol-2-yl)-3-methyl-4-methoxy-5-hydroxyimidazolidinone-(2).

7. Compound as claimed in claim 1 designated 1-(5-methylsulfonyl-1,3,4-thiadiazol-2-yl)-3-methyl-4-ethoxy-5-hydroxyimidazolidinone-(2).

8. Compound as claimed in claim 1 designated 1-(5-tert.butyl-1,3,4-thiadiazol-2-yl)-3-methyl-4-ethoxy-5-hydroxyimidazolidinone-(2).

9. Compound as claimed in claim 1 designated 1-(5-tert.butyl-1,3,4-thiadiazol-2-yl)-3-methyl-4-methoxy-5-hydroxyimidazolidinone-(2).

10. Compound as claimed in claim 1 designated 1-(5-tert.butyl-1,3,4-thiadiazol-2-yl)-3-methyl-4-isoproxy-5-hydroxyimidazolidinone-(2).

11. Compound as claimed in claim 1 designated 1-(5-trifluoromethyl-1,3,4-thiadiazol-2-yl)-3-methyl-4-methoxy-5-hydroxyimidazolidinone-(2).

* * * * *

UNITED STATES PATENT OFFICE
CERTIFICATE OF CORRECTION

Patent No. 3,759,939      Dated September 18, 1973

Inventor(s) Carl Metzger et al

It is certified that error appears in the above-identified patent and that said Letters Patent are hereby corrected as shown below:

Col. 1, line 31,

For  "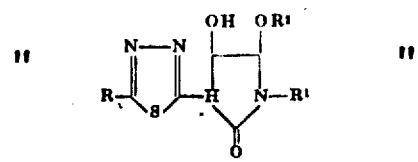"

Read  -- 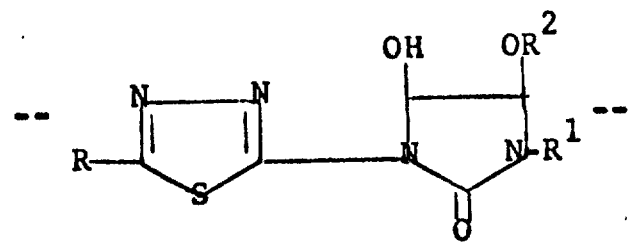 --

Col. 2, line 21,

For  "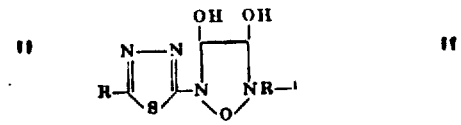"

Read  -- 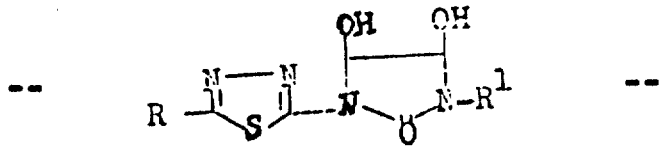 --

Page Two

UNITED STATES PATENT OFFICE
CERTIFICATE OF CORRECTION

Patent No. 3,759,939          Dated 9/18/73

Inventor(s) Carl Metzger et al

It is certified that error appears in the above-identified patent and that said Letters Patent are hereby corrected as shown below:

Col. 4, line 12,

For          " $CH_3$ "

Read         -- $CF_3$ --

Col. 6, line 59,
(Compound 5)

For 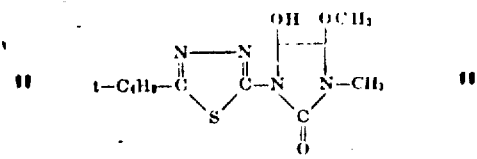

Read 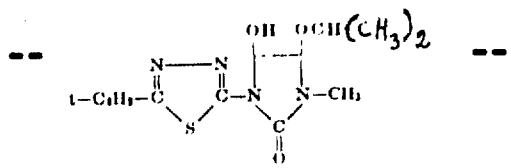

Col. 7, line 4,

For          "alkylarylpolygolycol"

Read         -- alkylarylpolyglycol --

UNITED STATES PATENT OFFICE
CERTIFICATE OF CORRECTION

Patent No. 3,759,939          Dated September 18, 1973

Inventor(s) Carl Metzger et al          Page - three

It is certified that error appears in the above-identified patent and that said Letters Patent are hereby corrected as shown below:

Col. 7, Table 1,

For 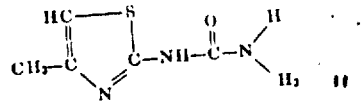

Read 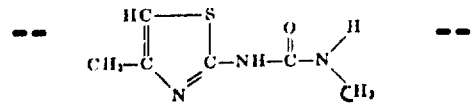

Col. 7, Table 2,
(Compound 4 first line) in column under "Oats"

For          "4"

Read         -- 5 --

Signed and sealed this 30th day of April 1974.

(SEAL)
Attest:

EDWARD M. FLETCHER, JR.          C. MARSHALL DANN
Attesting Officer                Commissioner of Patents